US012709148B2

(12) United States Patent
Jo

(10) Patent No.: US 12,709,148 B2
(45) Date of Patent: Aug. 18, 2026

(54) HYBRID POWER TRANSFER MODULE

(71) Applicant: VALEO KAPEC CO., LTD., Daegu (KR)

(72) Inventor: Aron Jo, Daegu (KR)

(73) Assignee: VALEO KAPEC CO., LTD., Daegu (KR)

( * ) Notice: Subject to any disclaimer, the term of this patent is extended or adjusted under 35 U.S.C. 154(b) by 0 days.

(21) Appl. No.: 18/800,211

(22) Filed: Aug. 12, 2024

(65) Prior Publication Data

US 2025/0058619 A1 Feb. 20, 2025

(30) Foreign Application Priority Data

Aug. 14, 2023 (KR) ........................ 10-2023-0106379

(51) Int. Cl.
*F16H 45/02* (2006.01)
*B60K 6/383* (2007.10)

(52) U.S. Cl.
CPC ............. *B60K 6/383* (2013.01); *F16H 45/02* (2013.01); *F16H 2045/0221* (2013.01)

(58) Field of Classification Search
CPC .... F16F 15/12353; F16F 15/12; B60K 6/383; B60K 6/387; F16H 45/02–2045/0294
See application file for complete search history.

(56) References Cited

U.S. PATENT DOCUMENTS 5,789,823 A * 8/1998 Sherman ................. F16H 61/62 290/46
11,028,899 B1 * 6/2021 Nelson ................... H02K 7/108
2022/0397186 A1 * 12/2022 Vögtle ...................... B60K 6/48
2024/0001755 A1 * 1/2024 Kim ....................... B60K 6/383
2024/0408954 A1 * 12/2024 Lee ......................... B60K 6/40

FOREIGN PATENT DOCUMENTS

DE 102018116587 A1 * 1/2019 ............... B60K 6/38
DE 102017214039 A1 * 2/2019
KR 10-2023-0077454 A 6/2023

OTHER PUBLICATIONS

Dictionary.com, Definition of “portion”, May 28, 2025, p. 1 (Year: 2025).*

* cited by examiner

*Primary Examiner* — Ernesto A Suarez
*Assistant Examiner* — Lillian T Nguyen
(74) *Attorney, Agent, or Firm* — Oblon, McClelland, Maier & Neustadt, L.L.P.

(57) ABSTRACT

A hybrid power transfer module is provided. The hybrid power transfer module having a drive shaft, a rotor hub, and an engine clutch, includes: a drive plate arranged on an outer circumference of the engine clutch; and a torsional damper, which is arranged to contact the drive plate and includes a plurality of springs. The drive plate and the torsional damper are arranged within the rotor hub.

11 Claims, 6 Drawing Sheets

HYBRID POWER TRANSFER MODULE

TECHNICAL FIELD

The present invention relates to a power transfer apparatus for hybrid vehicles.

BACKGROUND ART

The hybrid power transfer module can implement three modes: an ICE mode that transfers the power from the engine, an EV mode that transfers the power from the motor, and an HEV mode that simultaneously transfers power from both the engine and the motor. In the EV mode, which transfers power from the motor, it is essential to disengage the engine to prevent power loss due to engine inertia. This disengagement is a key technology in the hybrid power transfer module. A typical hybrid power transfer module equipped with a torque converter includes a CO clutch (or engine disconnect clutch) that can disengage the engine power, and a Cl clutch (or lock-up clutch) which acts as a launch device to transfer the overall system output.

An example of the prior art is shown in FIG. 1, where the engine power is transmitted to the torque converter 130 via the drive shaft 114, engine disconnect clutch 116, rotor hub 110, and front cover 132. The power is then transferred to the transmission through the lock-up clutch 134, lock-up piston 136, torsional damper 138, and driven plate 140. The hybrid module, comprising the torque converter 130 and torsional damper 138, requires additional components such as the driven plate 140 and retaining plate 142 for the damper system configuration.

In the case of a hybrid module where a one-way clutch is used as the engine disconnect clutch 116, the rotor hub 110 and torque converter 130, both of which have high inertia, are directly connected when the clutch 116 is engaged. As a result, a significant shock is applied to the clutch 116 when torque is applied from the engine.

In the prior art configurations, it is challenging to supply transmission fluid (ATF) to the engine disconnect clutch 116, making it prone to wear between the one-way clutch and its corresponding parts. In one example of the prior art, four hydraulic fluid passages are required for the control of the hybrid power transfer module. This includes two pressure lines for the operation and release of the CO clutch and two pressure lines for the operation and release of the Cl clutch. The need for additional pressure paths for the control of the hybrid power transfer module makes it difficult to develop electrified systems using existing transmissions that employ a 2-path or 3-path hydraulic fluid pressure route.

SUMMARY OF THE INVENTION

Problem to be Solved

The present invention aims to provide a hybrid power transfer module that can minimize the inertia moment applied to the one-way clutch type engine disconnect clutch (hereinafter also referred to as the 'engine clutch') when torque is applied from the engine.

Additionally, the present invention aims to provide a hybrid power transfer module that can reduce the number of components and shorten the axial length by integrating the functions of the rotor hub and torsional damper, which are essential in an HEV module configuration.

Furthermore, the present invention aims to provide a hybrid power transfer module equipped with a fluid passage that can directly supply ATF to the engine clutch and the coupled torsional damper.

The problems that the present invention seeks to solve are not limited to those mentioned above. Other unmentioned problems can be clearly understood by those skilled in the art from the description provided below.

Solution to Solve Problem

The hybrid power transfer module according to the present invention, which aims to achieve the above objectives, includes the following aspects, embodiments and any combination thereof.

In one aspect, the present invention provides a hybrid power transfer module including a drive shaft, a rotor hub, and an engine clutch, comprising a drive plate arranged on an outer circumference of the engine clutch and a torsional damper, which is arranged to contact the drive plate and includes a plurality of springs, wherein the drive plate and the torsional damper are arranged within the rotor hub.

In another embodiment, the engine clutch is configured to transmit engine torque to the drive plate when the engine torque is applied to the engine clutch.

In a further embodiment, the drive plate is configured to transmit engine torque received from the engine clutch to the torsional damper when engine torque is applied to the engine clutch.

In yet another embodiment, the drive plate has a plurality of hooks that project radially outward to transmit engine torque to the torsional damper.

In an additional embodiment, the hybrid power transfer module further comprises a rotor hub cover, and the rotor hub and the rotor hub cover each include a plurality of engagement portions configured to receive the springs of the torsional damper.

In still another embodiment, the engine clutch is a one-way clutch.

In a further embodiment, the hybrid power transfer module further comprises a torque converter, and the torque converter does not include a torsional damper.

In an additional embodiment, the hybrid power transfer module further comprises an oil passage in fluid communication with the engine clutch and/or the torsional damper.

In a further embodiment, the oil passage includes a first oil passage located radially inward of the engine clutch.

In an additional embodiment, the oil passage includes a second oil passage located radially outward of the engine clutch.

In another embodiment, the first oil passage is defined in the drive shaft.

In still another embodiment, the second oil passage is defined in the rotor hub cover or the rotor hub.

In another aspect, the present invention provides a hybrid power transfer module comprising a drive shaft for transmitting engine torque, a rotor hub in which a rotor of a motor is mounted, an engine clutch connected to the drive shaft, and a torsional damper disposed between the engine clutch and the rotor hub.

In another embodiment, the torsional damper includes a drive plate, one or more springs, and a driven plate, wherein the driven plate includes the rotor hub.

In yet another embodiment, the engine clutch includes a power input portion for inputting power from the drive shaft and a power output portion for outputting power during operation of the engine clutch, and the drive plate is coupled to the power output portion.

In a further embodiment, the engine clutch includes a one-way clutch, the power input portion includes an inner race of the one-way clutch, and the power output portion includes an outer race of the one-way clutch.

Effects of the Invention

According to the present invention, the inertia moment applied to the engine clutch when torque is applied from the engine is minimized, thereby reducing the shock experienced by related components.

Additionally, the present invention reduces the axial length of the hybrid power transfer module, which can improve its integration into hybrid vehicles.

Furthermore, the present invention facilitates the cooling and lubrication of the engine clutch and the coupled torsional damper.

The effects of the present invention are not limited to those mentioned above, and other unmentioned effects can be clearly understood by those skilled in the art from the description provided below.

BRIEF DESCRIPTION OF THE DRAWINGS

The following description can be better understood when read in conjunction with the accompanying drawings. Elements that have the same reference numerals in different figures have similar functions and may not be repeatedly described unless necessary for the understanding of the invention. Known elements may be briefly described or omitted, but this should not be understood as being excluded from the embodiments of the present invention.

DETAILED DESCRIPTION OF THE INVENTION

Figure 1:
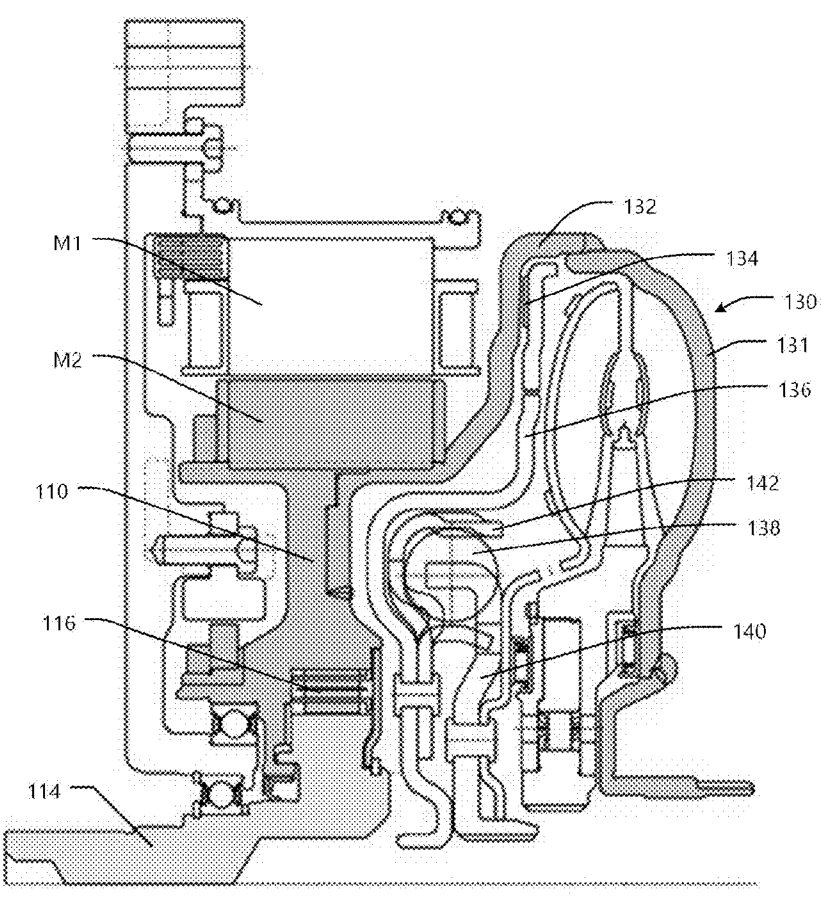
FIG. 1 is a partial cross-sectional view of an example of a prior art hybrid power transfer module.

The present invention is not limited to the embodiments disclosed below and can be modified in various ways and implemented in different forms. The embodiments provided are merely for the purpose of fully disclosing the invention and informing those skilled in the art of the scope of the invention. Thus, the present invention should not be construed as being limited to the embodiments disclosed below but should be understood to encompass all modifications, equivalents, or alternatives falling within the technical spirit and scope of the invention.

The attached drawings are provided merely for the convenience of understanding the embodiments disclosed in this specification and should not be construed as limiting the technical spirit disclosed in the specification. The invention should be understood to encompass all modifications, equivalents, or alternatives within the spirit and scope of the invention, and not be limited by the drawings. The components in the drawings may be exaggerated in size or thickness for clarity, but this should not limit the scope of the invention.

Terms used in this specification are meant to describe specific implementations or embodiments and are not intended to limit the invention. Singular terms are intended to include plural forms unless context dictates otherwise. Terms such as "comprise" or "include" in this specification are intended to specify the presence of the features, numbers, steps, operations, components, or parts described, and do not exclude the possibility of additional features, numbers, steps, operations, components, or parts.

Ordinal terms such as "first" and "second" may be used to describe various components but are not intended to limit the components by those terms. These terms are used merely to distinguish one component from another.

When a component is said to be "connected to," "coupled with," or "linked to" another component, it may be directly connected to or coupled with the other component, or there may be other components present in between. Conversely, if a component is said to be "directly connected to" or "directly coupled with" another component, it should be understood that no other components are present in between.

When a component is described as being "on top of" or "below" another component, it should be understood that this refers not only to being directly above or below but may also include the presence of other components in between.

Unless otherwise defined, all technical or scientific terms used herein have meanings generally understood by those skilled in the relevant field of technology. Terms commonly defined in general dictionaries should be interpreted in the context of the relevant technology and not in an idealized or overly formal manner unless clearly defined otherwise in this specification.

The assembly of embodiments may be symmetrical with respect to the axis, and thus, for convenience of illustration, only half may be shown in the drawings. Additionally, for convenience of explanation, the direction along the length of the axis that forms the center of rotation of the assembly is referred to as the axial direction. The front direction or axial direction is parallel to the rotation axis, with the front (forward) direction meaning the direction toward the power source, such as a vehicle drive motor, and the rear (backward) direction meaning the direction toward another component, such as a transmission. Therefore, the front face refers to the surface facing the front direction, and the rear face refers to the surface facing the rear direction.

The radial or radial direction refers to the direction along a line passing through the center of rotation on a plane perpendicular to the rotation axis, either toward or away from the center. The direction away from the center in the radial direction is referred to as the centrifugal direction, and the direction toward the center is referred to as the centripetal direction.

The circumferential or peripheral direction refers to the direction surrounding the rotation axis. The outer circumference refers to the outer perimeter, and the inner circumference refers to the inner perimeter. Thus, the outer circumferential surface is the surface facing away from the rotation axis, and the inner circumferential surface is the surface facing the rotation axis. The circumferential surface refers to the surface whose normal is directed in the circumferential direction.

The present invention will be described in detail with reference to the attached drawings.

Figure 2:
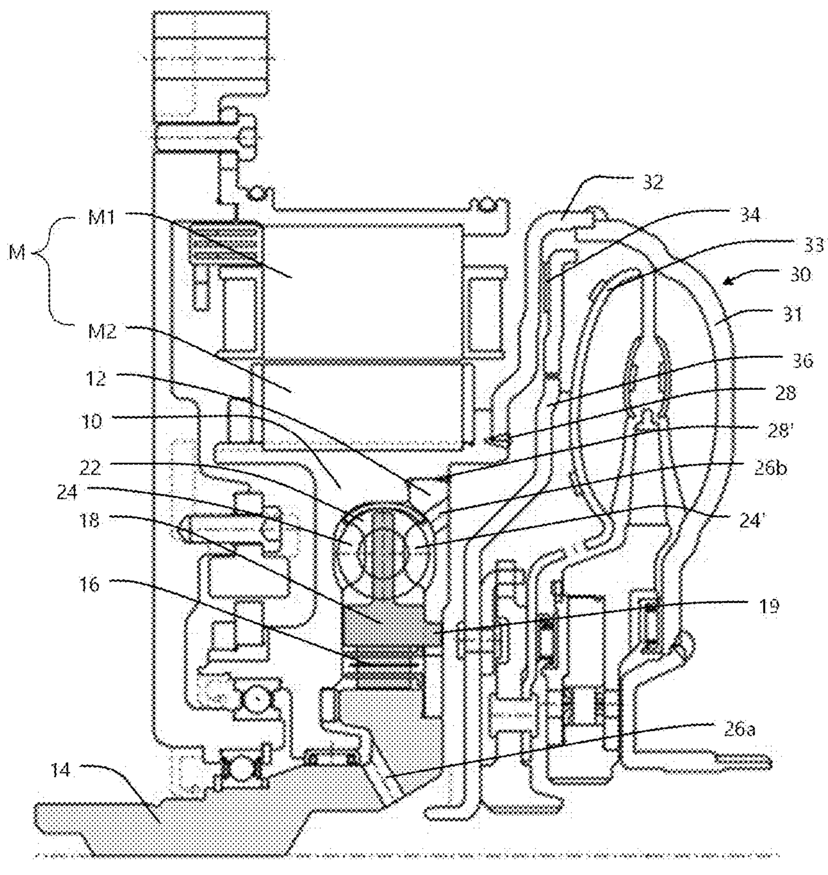
FIG. 2 is a partial cross-sectional view of a hybrid power transfer module according to an embodiment of the present invention.

FIG. 2 schematically shows a longitudinal section of a hybrid power transfer apparatus according to an embodiment of the present invention. For convenience of explanation, only the upper half of the longitudinal section is shown, as the apparatus is symmetrical about the rotation axis.

The power transfer apparatus of the present invention, as shown in FIG. 2, includes a drive shaft 14 and a rotor hub 10. The drive shaft 14 is connected to the crankshaft of the engine (not shown) positioned on the left side of the figure, receiving the driving force from the engine. The drive shaft 14 is coupled with an engine clutch 16, which transfers the driving force from the engine to a front cover 32. The rotor hub 10 transmits the driving force of a motor M, consisting of a stator M1 and a rotor M2, to the front cover 32. The rotor hub 10 and the front cover 32 can be joined by a fastening element 28, such as welding. Additionally, a torque converter 30 is connected to the front cover 32 and includes an impeller 31 that rotates together with the front cover 32, a turbine 33 that transmits the driving force to the transmission coupled to the impeller 31, and a lockup clutch 34 and lockup piston 36 that directly transmit the driving force of the engine or motor to the turbine 33.

The above configuration is suitable for a hybrid power transfer module used in a front-wheel drive hybrid system.

The engine clutch 16 may be an one-way clutch (OWC), so no separate engine clutch control is required. The drive shaft 14 may be arranged as an inner race on the inner circumference of the engine clutch 16, and an outer race 18 may be arranged on the outer circumference of the engine clutch 16. A torsional damper 22 may be disposed on the outer circumference of the outer race 18. That is, the torsional damper 22 is positioned within the rotor hub 10 located outside the torque converter 30, rather than being arranged inside the torque converter 30 as in the prior art. Specifically, the torsional damper 22 is arranged radially outward from the engine clutch 16 with the outer race 18 in between. A wet damper using automatic transmission fluid (ATF) as a lubricant may be employed for the damper 22.

Figure 6:
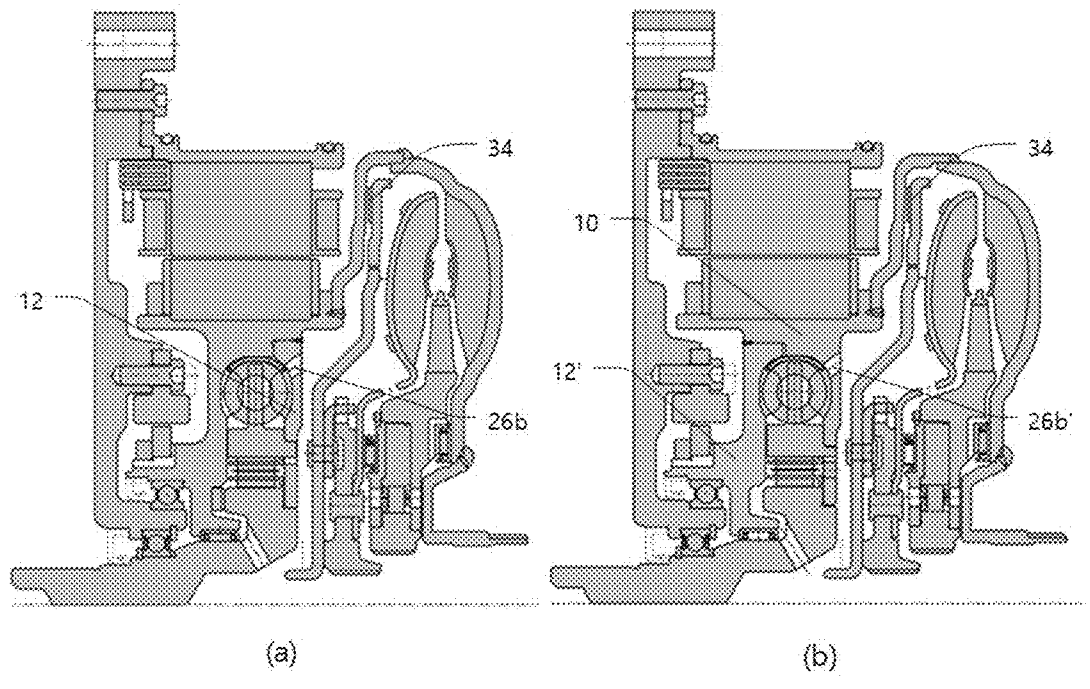
FIG. 6 shows the arrangements of the rotor hub cover according to the present invention.

The torsional damper 22 is housed between the rotor hub 10 and the rotor hub cover 12 in the axial direction. The rotor hub cover 12 may be secured to the rotor hub 10 by welding (e.g., electron beam welding, MAG welding, laser welding, etc.) (see reference numeral 28' in FIG. 2) or physically fastened to the rotor hub 10 using separate components such as a snap ring or retaining plate. The position of the rotor hub cover 12 may be provided to the right side of the torsional damper 22 as shown in FIG. 2, or alternatively, to the left side (see FIG. 6(*b*); FIG. 6(*a*) refers to the same position as FIG. 2).

Figure 3:
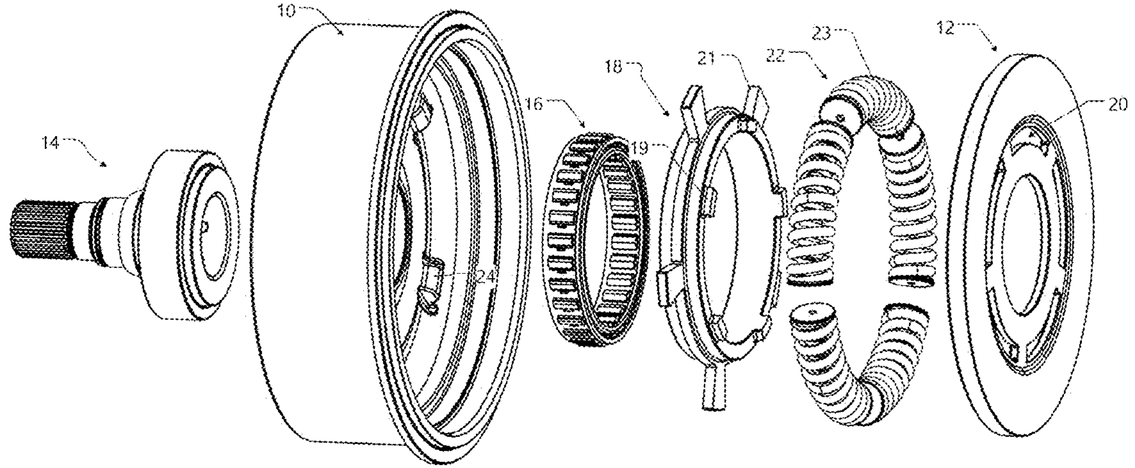
FIG. 3 is an exploded perspective view of a portion of the hybrid power transfer module according to an embodiment of the present invention.
Figure 4:
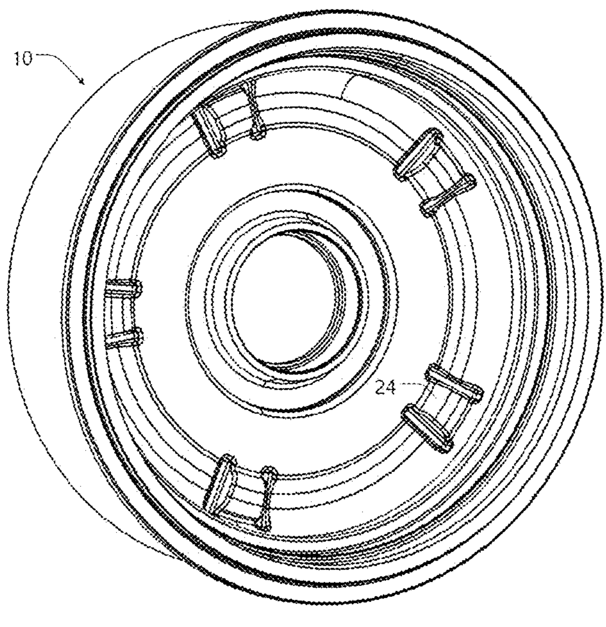
FIG. 4 is a perspective view of the rotor hub according to an embodiment of the present invention.
Figure 5:
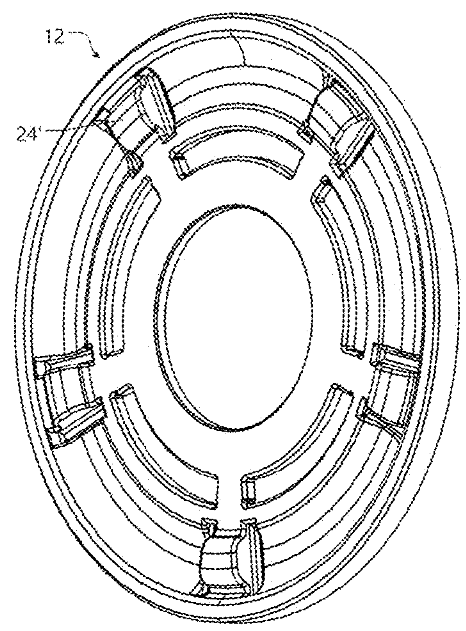
FIG. 5 is a perspective view of the rotor hub cover according to an embodiment of the present invention.

A number of springs 23 (five springs are shown in the example in FIG. 3) equipped in the torsional damper 22 are seated in spring engagement portions 24 formed protruding from the rotor hub 10 and in spring engagement portions 24' formed protruding from the rotor hub cover 12 positioned axially opposite the rotor hub 10 with the torsional damper 22 in between (see FIG. 4 and FIG. 5). Due to this damping structure arrangement, the driven plate or retaining plate of the damper becomes unnecessary, resulting in a more compact power transfer module and improved integration into hybrid vehicles.

In a hybrid system, when the engine speed increases and exceeds a critical point, the driving force of the engine is transmitted to the one-way clutch 16. According to the arrangement described, the engine's driving force is transmitted through the engine clutch 16 and the outer race 18 to the torsional damper 22. In this context, the outer race 18 functions as a ‘drive plate’ for transmitting the engine's driving force.

Referring to FIG. 2, in the present invention, the only component that is rigidly coupled to the engine clutch 16 when the engine's driving force is engaged is the outer race 18. Thus, the inertia imparted to the engine clutch 16 when the engine's driving force is applied is only the magnitude generated by the outer race 18. In contrast, in the prior art configuration shown in FIG. 1, the inertia imparted to the engine clutch 16 in the same situation is the sum of the magnitudes generated by the rotor hub 110, the motor's rotor M2, the front cover 132, the impeller 131, and other associated components. FIGS. 1 and 2 highlight the components that contribute to the inertia moment applied to the engine clutch 116, 16 when the engine's driving force is engaged from the drive shaft 114, 14.

According to the simulation conducted by the present inventors, the inertia moment applied to the engine clutch in the prior art configuration (FIG. 1) is 0.1237 $kg\cdot m^2$, whereas in the configuration according to the present invention, the inertia moment applied to the engine clutch is only 0.00133 $kg\cdot m^2$. Due to the reduction in output-side inertia force of the engine clutch 16 when torque is applied from the engine, it becomes easier to cope with the impact received by the one-way clutch, and the responsiveness can be improved. Moreover, as the torsional damper 22 is positioned directly adjacent to the engine clutch 16 in the power transmission system, it is easier to absorb shocks caused by engine fluctuations, and it is possible to reduce the capacity of the engine clutch 16.

As such, the present invention integrates the damping structure previously coupled with the lock-up clutch into the rotor hub. Despite this modification in the damping structure, no adverse effects on the hybrid power transfer flow have been observed. In fact, when the motor output is transmitted, the absence of a damping structure in the power transfer path reduces fluctuations associated with motor power transfer.

Referring to FIG. 3, a stopper 19 may be protruded in the axial direction from the outer race 18 to prevent excessive compression of the spring 23. This stopper 19 may be designed to engage with a stopper groove 20 provided on the rotor hub cover 12. Additionally, the outer race 18 may be equipped with a plurality of hooks 21 protruding in the radial direction for transmitting power to the damper 22.

Figure 7:
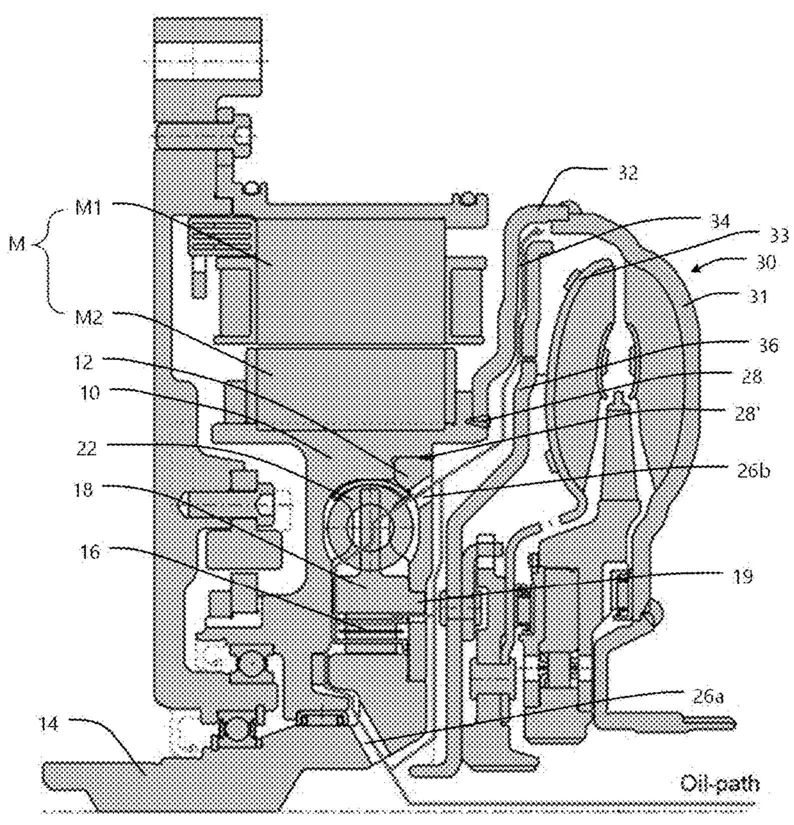
FIG. 7 illustrates the flow path of ATF according to an embodiment of the present invention.

Passages for ATF (automatic transmission fluid) for cooling and lubrication of the damper 22 and engine clutch 16 are provided. As shown in FIG. 7, oil passages 26*a* and 26*b* are defined in the drive shaft 14 and the rotor hub cover 12, respectively. In addition to the direct supply path of ATF to the lock-up clutch 34 of the torque converter 30, the path marked as ‘Oil-path’ indicates that ATF is also directed through the engine clutch 16 and the torsional damper 22 to merge towards the lock-up clutch 34. This configuration ensures that ATF can be sufficiently supplied to the engine clutch 16 and the torsional damper 22.

In the case where the rotor hub cover 12' is positioned on the opposite side of the lock-up clutch 34 as shown in FIG. 6(*b*), an oil passage 26*b'* may be defined in the rotor hub 10.

As described above, the present invention proposes a hybrid module configuration where a torsional damper is integrated with the rotor hub for a compact system design. By placing an outer race with relatively low inertia behind the engine clutch, the invention can reduce the shock when torque is applied from the engine, while the torsional damper further dampens vibrations.

Although the embodiments of the present invention have been described with reference to the attached drawings, those skilled in the art will understand that the invention can be implemented in various other specific forms without departing from its technical spirit or essential features. Therefore, the embodiments described above are illustrative and not restrictive. The scope of the present invention is to be determined by the claims below, and all technical ideas within the equivalent range of these claims should be considered to fall within the scope of the invention.

What is claimed is:

1. A hybrid power transfer module including a drive shaft, a rotor hub, and an engine clutch defined by an annular shape having an inner circumference and an outer circumference, the drive shaft being coupled with the inner circumference of the engine clutch, comprising:

a drive plate arranged on the outer circumference of the engine clutch; and a torsional damper, which is arranged to contact the drive plate and includes a plurality of springs; and a rotor hub cover, wherein the drive plate and the torsional damper are arranged within the rotor hub, wherein the engine clutch is configured to transmit engine torque to the drive plate when the engine torque is applied to the engine clutch, and wherein the rotor hub and the rotor hub cover each include a plurality of engagement portions configured to receive the springs of the torsional damper.

2. The hybrid power transfer module of claim 1, wherein the drive plate is configured to transmit engine torque received from the engine clutch to the torsional damper when engine torque is applied to the engine clutch.

3. The hybrid power transfer module of claim 2, wherein the drive plate has a plurality of hooks that project radially outward to transmit engine torque to the torsional damper.

4. The hybrid power transfer module of claim 1, wherein the engine clutch is a one-way clutch.

5. The hybrid power transfer module of claim 1, further comprising a torque converter, wherein the torque converter does not include a torsional damper.

6. A hybrid power transfer module including a drive shaft, a rotor hub, and an engine clutch defined by an annular shape having an inner circumference and an outer circumference, the drive shaft being coupled with the inner circumference of the engine clutch, comprising:

a drive plate arranged on the outer circumference of the engine clutch;

a torsional damper, which is arranged to contact the drive plate and includes a plurality of springs; and an oil passage in fluid communication with the engine clutch and/or the torsional damper, wherein the drive plate and the torsional damper are arranged within the rotor hub, wherein the engine clutch is configured to transmit engine torque to the drive plate when the engine torque is applied to the engine clutch, wherein the oil passage includes a first oil passage located radially inward of the engine clutch, and wherein the oil passage includes a second oil passage located radially outward of the engine clutch.

7. The hybrid power transfer module of claim 6, wherein the first oil passage is defined in the drive shaft.

8. The hybrid power transfer module of claim 6, wherein the second oil passage is defined in the rotor hub cover or the rotor hub.

9. A hybrid power transfer module comprising:

a drive shaft for transmitting engine torque;

a rotor hub in which a rotor of a motor is mounted;

an engine clutch connected to the drive shaft; and a torsional damper disposed between the engine clutch and the rotor hub, wherein the torsional damper includes a drive plate, one or more springs, and a rotor hub cover, and wherein the rotor hub and the rotor hub cover each includes a plurality of engagement portions configured to receive the springs of the torsional damper.

10. The hybrid power transfer module of claim 9, wherein the engine clutch includes:

a power input portion for inputting power from the drive shaft; and a power output portion for outputting power during operation of the engine clutch;

wherein the drive plate is coupled to the power output portion.

11. The hybrid power transfer module of claim 10, wherein the engine clutch includes a one-way clutch, the power input portion includes an inner race of the one-way clutch, and the power output portion includes an outer race of the one-way clutch.

* * * * *